L. G. WILCOX.
SAND APPARATUS FOR VEHICLES.
APPLICATION FILED NOV. 7, 1917.

1,283,004.

Patented Oct. 29, 1918.

WITNESS
Alfred T. Bratton

INVENTOR.
Lewis G. Wilcox,
BY Victor J. Evans
ATTORNEY.

UNITED STATES PATENT OFFICE.

LEWIS G. WILCOX, OF PHILADELPHIA, PENNSYLVANIA.

SAND APPARATUS FOR VEHICLES.

1,283,004.      Specification of Letters Patent.      Patented Oct. 29, 1918.

Application filed November 7, 1917. Serial No. 200,765.

*To all whom it may concern:*

Be it known that I, LEWIS G. WILCOX, a citizen of United States, residing at 4617 Newhall street, Germantown, Philadelphia, in the county of Philadelphia and State of Pennsylvania, have invented new and useful Improvements in Sand Apparatus for Vehicles, of which the following is a specification.

The invention relates to sand apparatus for use in sanding tracks or highways, immediately in front of the wheels of a vehicle so as to secure a better adhesion of the wheels of the vehicle to the surface, and prevent slipping or skidding.

The invention is particularly adapted for use in connection with motor vehicles, so that when a driver is operating over a wet and slippery street, he can readily distribute a quantity of sand immediately in front of the rear wheels, and which sand following in the highway in front of the wheels, or being taken up by the rubber tires of the wheels, will prevent skidding upon the surface when the driver comes to a sudden stop, or turns a sharp corner.

Further, my invention comprehends a construction whereby suitable sand boxes can be electrically operated to distribute the sand, and may also be connected with the braking mechanism of the automobile and its electric circuit, so that upon the application of the brake to stop the vehicle or slow down, the sand will be automatically distributed in front of the rear wheels of the motor vehicle.

I am aware that various forms of antiskidding devices on motor vehicles have been used heretofore, and one for instance, is generally known as a tire chain. These chains are applied to traverse the periphery of the wheel or tire and coming in contact with the highway, prevent the skidding of the vehicle. Devices of this character are not absolutely positive to prevent skidding; furthermore, are noisy and wear out quickly, and also wear out the rubber tires in a short space of time. Aside from the above mentioned discrepancies, tire chains are usually cumbersome devices to manipulate in applying same to the tires and wheels, and are not altogether as efficient as it is desired for an antiskid device.

To the end that a positive anti-skidding device may be provided for a motor vehicle, and which will take up but very little of the electric current generated by the vehicle, or contained in a storage battery, it is proposed to sand the highway or tires of the motor vehicle, and it will be clearly apparent that this will not injure the tires in any way; will be absolutely noiseless, and will insure proper operation of a motor vehicle over a wet and slippery street.

In the further disclosure of the invention, reference is to be had to the accompanying drawing, constituting a part of this specification, in which similar characters of reference denote corresponding parts in all the views, and in which—

Figure 1:
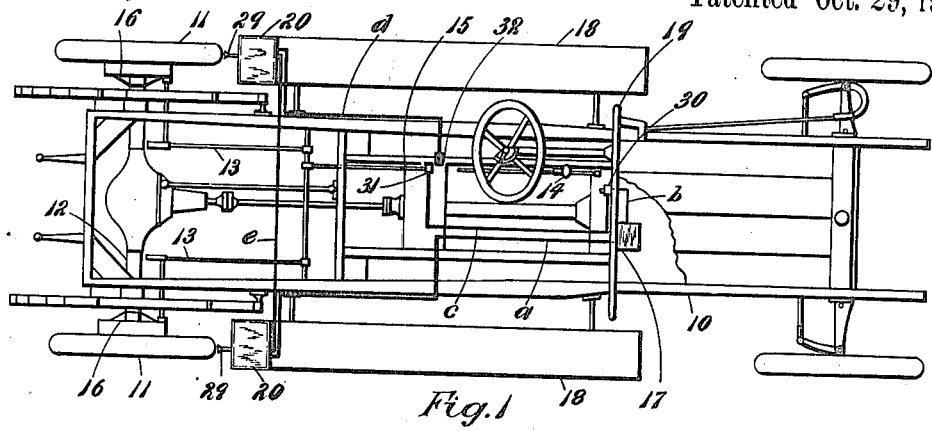
Figure 1 is a fragmentary plan view of an automobile chassis showing substantially diagrammatically the electric connections of my device applied to the chassis of the vehicle.
Figure 2:
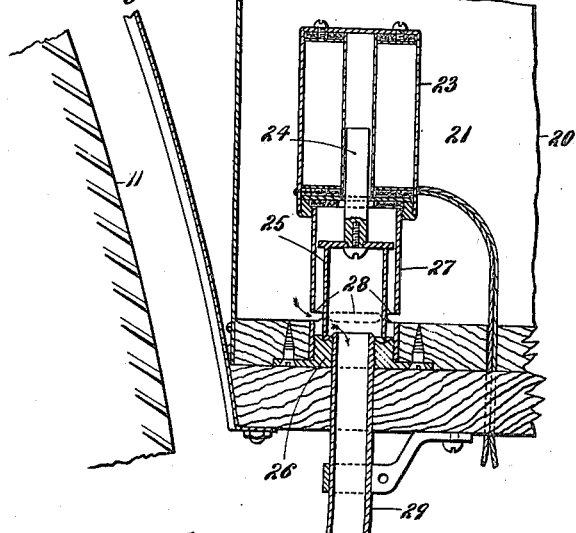
Fig. 2 is a fragmentary vertical sectional view taken through one of the sand boxes showing the mechanism.
Figure 3:
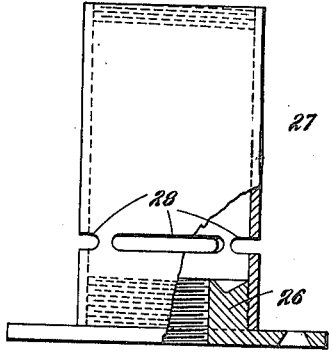
Fig. 3 is a side elevation, partially in section, of the valve casing.
Figure 4:
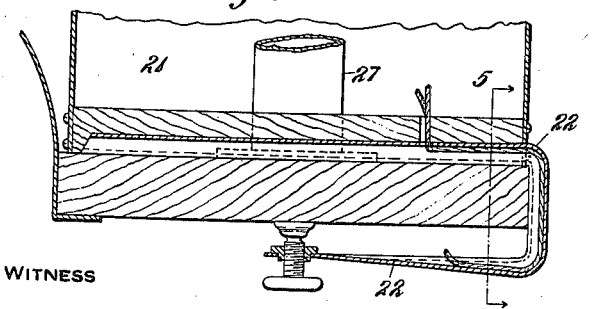
Fig. 4 is a transverse vertical sectional view taken through the running board of the vehicle showing substantially the method of attaching the sand box.
Figure 5:
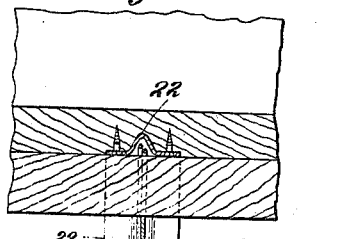
Fig. 5 is a vertical transverse sectional view taken along the line 5—5 of Fig. 4.

Referring more particularly to the views, I disclose the usual form of motor vehicle chassis 10, having the usual rear rubber-tired wheels 11 mounted on a transverse axle 12, the usual brake mechanism 13 being provided, whereby as will be readily understood, when the operator pushes on the brake pedal 14, the brake mechanism through the rods 15 will apply the brakes to the drum 16 on the rear axle adjacent the wheels. The chassis also discloses the usual magneto or storage battery 17, running boards 18 and dash 19.

Mounted on each running board at the rear thereof, is a sand box 20, which consists of the box proper 21 suitably secured by a suitable U-shaped clamp 22 to the running board, and which box is preferably filled with sand and contains a solenoid 23 including a movable stem 24 to which is attached a cylindrical valve 25 normally resting on a recessed seat 26 secured to the running board, and forming a part of the casing. The valve is encircled by a valve casing 27 provided with a series of elongated horizontal openings 28, and it will be clearly apparent that when the valve 25 is in its upper position, the sand will gravitate through the openings 28 into a pipe 29 which extends down to a point immediately in front of one of the rear wheels, to deliver the sand at that point.

Referring to Fig. 1 it will be seen that an electric wire $a$ is connected with the magneto or storage battery 17 and extends to one of the sand boxes 20, with a wire $b$ extending from the magneto 17 to a switch 30 located on the dash 19, a wire $c$ extending from the switch to a contact element 31 on one of the brake rods 15. Another wire $d$ passes from a stationary contact element 32, on the chassis, to the other sand box 20, and finally a wire $e$ connects with the two sand boxes, thus completing the electric circuit, as will be hereinafter more fully disclosed.

Now it will be apparent that the operator of a motor car naturally would not desire to waste any sand upon the highway at times when the streets are not wet and slippery, and it will be clear that the device described is so arranged and constructed, and designed for manipulation, that it is only supposed to be used when the streets are wet and slippery. It is for this reason that the switch 30 is provided, and this switch may be in every particular called a "cut-out" switch for when the same is in an inoperative or cut-out position, the electric circuit will be open, and that when the elements 31 and 32 come in contact when the brake is applied, the solenoids in the sand boxes will not operate, due to the fact that they naturally cannot be energized on account of the broken circuit. On a wet and slippery day, however, the operator of the motor vehicle throws the switch 30 so as to bridge the gap between the wires $b$ and $c$, and thus when he subsequently pushes the brake of the motor vehicle, thereby moving the contact 31 into engagement with the contact 32, it will be clear that the circuit will be closed and the solenoids in the sand boxes energized, so as to operate the valves 25 and move them into open position, thereby permitting the sand to pass from the interior of the boxes 21 through the openings 28, and into the sand pipes 29, from which the sand will gravitate to the ground immediately in front of the rear wheels, and thus prevent skidding upon the highway, the tires furthermore, gathering up the sand as the motor vehicle proceeds, so that the tires will be substantially covered on their treads with a layer of sand, and thereby absolutely prevented from slipping.

It will be clear that a device of this character will be extremely useful in cases where a motor vehicle becomes stuck in a rut, the bottom of which may be of slimy mud, and in which the wheels ordinarily turn around and slide without any adhesion to the ground. In an instance of this character, a quantity of sand deposited in the bottom of the rut will give the tires a chance to grip, and thus enable the motor vehicle to be pulled out of the rut.

It will be clear that slight departures may be made from the herein disclosed construction, in order that my device may be adapted to different forms of motor vehicles and the like, and that I do not limit myself to the particular disclosure herein, the scope of the invention being defined in the appended claims.

I claim:

1. In combination with the electric circuit and the brake of a motor vehicle, a sand box for distributing sand adjacent wheels of the vehicle, a valve connected with the electric circuit and operable thereby for controlling the flow of sand from the sand box, means operable with the brake to close the electric circuit to the valve when the brake is operated, and a switch in the electric circuit for throwing said means into or out of said electric circuit.

2. In combination with the chassis of a motor vehicle, the electric circuit and the brake of said motor vehicle, means for operating the brake, a sand container, a valve normally preventing the discharge of sand from the sand container, said valve having connection with the electric circuit whereby the valve will be operated when the circuit is closed, with said brake connected in said electric circuit whereby when the brake is actuated, the circuit to the valve will be closed to open said valve, and means for cutting out the electric connection of said brake with said electric circuit, whereby said brake can be operated without causing the operation of said valve.

3. A sanding device for automobiles comprising a sand box located on each running board, a pipe for leading the sand from each box to a point adjacent a wheel, a valve controlling the inlet of sand to said pipe, a solenoid actuating said valve, an electric circuit connected with said solenoid, a switch in said circuit and a stationary and movable contact in said circuit, said movable contact being carried by a part of the brake mechanism.

4. A sanding device for automobiles comprising a sand box located on each running board, a pipe for leading the sand from each box to a point adjacent the wheel, a valve casing surrounding the inlet end of said pipe, said casing having slots therein, a valve in said casing normally closing the end of said pipe, a solenoid having its core connected with said valve, wires connecting said solenoid with the source of energy, a stationary contact connected with one wire, a movable contact carried by a movable part of the brake mechanism and connected with the other wire and switch means connected with said wires.

In testimony whereof I affix my signature.

LEWIS G. WILCOX.